(12) United States Patent
Orsat

(10) Patent No.: US 7,532,589 B2
(45) Date of Patent: May 12, 2009

(54) METHOD OF COMMUNICATION BETWEEN OBJECTS

(75) Inventor: Jean-Michel Orsat, Chatillon-sur-Cluses (FR)

(73) Assignee: Somfy SAS, Cluses (FR)

( * ) Notice: Subject to any disclaimer, the term of this patent is extended or adjusted under 35 U.S.C. 154(b) by 1001 days.

(21) Appl. No.: 10/611,239

(22) Filed: Jun. 30, 2003

(65) Prior Publication Data

US 2004/0039915 A1 Feb. 26, 2004

(30) Foreign Application Priority Data

Jul. 10, 2002 (FR) .................................. 02 08684

(51) Int. Cl.
*H04B 7/005* (2006.01)
(52) U.S. Cl. .................. 370/278; 370/282; 340/5.2; 340/5.8; 713/170; 713/176
(58) Field of Classification Search ................ 380/277; 370/278, 382; 340/5.2, 5.8; 713/170, 176
See application file for complete search history.

(56) References Cited

U.S. PATENT DOCUMENTS

| 5,355,413 | A | | 10/1994 | Ohno |
| 5,875,108 | A | * | 2/1999 | Hoffberg et al. .............. 700/17 |
| 6,393,270 | B1 | * | 5/2002 | Austin et al. ................. 455/411 |
| 6,513,117 | B2 | * | 1/2003 | Tarpenning et al. .......... 713/156 |
| 2002/0026525 | A1 | * | 2/2002 | Armitage ..................... 709/238 |
| 2006/0242299 | A1 | * | 10/2006 | Karger et al. ................ 709/226 |

FOREIGN PATENT DOCUMENTS

EP 1 085 481 A 3/2001
JP 2001 160085 6/2001

OTHER PUBLICATIONS

Preliminary Search Report issued by French Patent Office for corresponding French priority application FR 0208684, dated Apr. 9, 2003.

\* cited by examiner

*Primary Examiner*—Brenda Pham
*Assistant Examiner*—Sai-Ming Chan
(74) *Attorney, Agent, or Firm*—Frommer Lawrence & Haug LLP; Ronald R. Santucci

(57) ABSTRACT

The method applies to objects comprising a memory in which there is a mathematical mapping and at least one key. It is a method which comprises the following steps:
calculation, in a first object, of the image of a number via a mapping which is the image via the mapping contained in memory of the key contained in memory,
transmission, by this object, of a frame containing an order, the number and its image,
reception by each of the other objects,
calculation, in each other object, of the image of the number via a mapping which is the image via the mapping contained in memory, of the key contained in memory,
comparison of the images of the number,
execution of the order if these images are equal.

5 Claims, 2 Drawing Sheets

METHOD OF COMMUNICATION BETWEEN OBJECTS

This application claims priority benefits of French patent application number 0208684 filed Jul. 10, 2002.

FIELD OF THE INVENTION

The present invention relates to a method of communication between objects each comprising a memory in which is one and the same mathematical mapping F dependent on several variables and at least one key, and communicating among themselves by virtue of one and the same protocol.

These objects are, for example, used for technical management and management of comfort in a residential building or in a commercial building.

BACKGROUND OF THE INVENTION

A problem encountered in communication networks is the multiplicity of origins and of functionalities of the products, the latter having however to share the resources of one and the same communication network. Specifically, it is often necessary to use a mode of addressing of the so-called "broadcast" type when one wishes to transmit an order to all the nodes of a network. When communication in the network is achieved via radio waves, the effect of this operation is not limited solely to the network concerned, but to all of the products complying with the same protocol and situated within range. For example, the products of neighboring apartments will also be affected, in the case of a residence.

Such broadcasting of orders does not correspond to a security operation. It entails for example the measurement of temperature of a sensor. However, if this operation requires the sending of an acknowledgement of receipt, it is understood that the needless invoking of the receivers of other networks incurs the risk of causing congestion and/or saturation of the network concerned.

The network can be used equally well for the control of heating and air conditioning apparatus as for lighting apparatus, or else to control ventilation sashes, solar shields or fasteners. These apparatus are built by various manufacturers who usually benefit from sharing one and the same communication network, so as to make it possible to coordinate, actions, that yesterday were independent, and to thus increase comfort and economies of energy.

It is generally essential to structure such a network if only to create pairings between objects transmitting orders and objects receiving orders, one and the same transmitter possibly controlling several receivers and/or several transmitters possibly controlling one and the same receiver. A tree structure can thus be constructed, according to known methods of the prior art.

DESCRIPTION OF THE PRIOR ART

Patent application EP 1 085 481, the content of which is incorporated by reference, discloses a means and a method allowing a master transmitter to broadcast an authentication key to other elements.

Specifically, the communication protocol generally provides for one or more authentication procedures so that an order receiver can be certain that the order transmitter from which it receives a command is authorized to command it.

The appearance of low-cost bidirectional devices is prompting authentication to be constructed around a dialog between the two units, doing so using a foolproof procedure even if part of the dialog is received by an unauthorized third party. These dialog processes have been developed in particular in e-banking applications.

Patent U.S. Pat. No. 3,806,874, the content of which is incorporated by reference, discloses such a method. The general principle is to house, in each unit, one and the same nonlinear algorithm, used to implement a so-called "challenge" procedure.

When a transmitter of orders B wishes to send an order to a receiver of orders A requiring the authentication of the transmitter, the latter must prove that it is authorized to issue an order. To do this, the receiver of orders A sends the transmitter B a, for example random, number NA. Each of the parties calculates the image of NA with the aid of their algorithm. When the calculation is finished, the transmitter B forwards its result RB to A which compares it with its own result RA. If RA=RB, then the challenge is positive and the transmitter B can send an order to the receiver A.

Of course, these are not individual calculation algorithms, specific to each link, that are duplicated in the units that have to communicate. All the units generally share the same algorithm, but the latter is at least a function of two variables R(K, N), one of the variables K being the common key, shared during the setting up of a communication link in a prior configuring phase and the other variable N being the calculation value, generally random, forwarded during each challenge procedure.

Each pairing procedure thus requires the sharing of an authentication key K between two objects.

According to the prior art, all the objects belonging to one and the same group share one and the same authentication key, but this key is normally used to validate a plurality of point-to-point communications.

A simple means of addressing oneself to a group of objects from among the entire set so as to broadcast information or a command to this group would be to accompany the message with the common authentication key. Each receiver could then assure itself that this key is identical to that which it possesses. A receiver for which this is not the case would be aware that it is not concerned, and could switch to idle mode. However, this solution has a major drawback. Specifically, this method divulges the common key, thereby causing the entire network to lose all security.

It would also be possible to proceed likewise, not with the key but with a group identifier, that would have been shared between all the objects of the network, this time in a nonconfidential manner. This process seems simple, but it too has a drawback since it leads to the twinning of the essential confidential information (key) with public information (identifier) and hence to the increasing of the memory resources required.

SUMMARY OF THE INVENTION

The aim of the invention is to provide a method of communication alleviating these drawbacks. In particular, it proposes to provide a simple and safe method of communication allowing the sending of an order, from an object to objects of one and the same network from among the entire set of objects using the same communication protocol or the sending of an order, from an object to a group of objects from among the entire set of objects belonging to the network. The aim of the invention is also to produce an installation allowing the implementation of such a method.

The method of communication according to the invention is characterized by the characterizing part of claim 1.

The objects may belong to one and the same network.

The key or the keys which each object contains may have been shared by several objects during a prior configuring phase.

The key or one of the keys which each object contains may be the same for each object which has been built by one and the same manufacturer or by a group of manufacturers.

The installation for the implementation of the method comprises objects O, wherein each object O comprises a memory in which is recorded one and the same mathematical mapping, means of communication with the other objects and a logic processing unit comprising a program for generating random numbers and a program for calculating the image of a value via the mapping.

The appended drawing represents, by way of example, a mode of execution of the method of communication according to the invention and the diagram of an installation for the implementation of this method.

DESCRIPTION OF THE PREFERRED EMBODIMENTS

Figure 1:
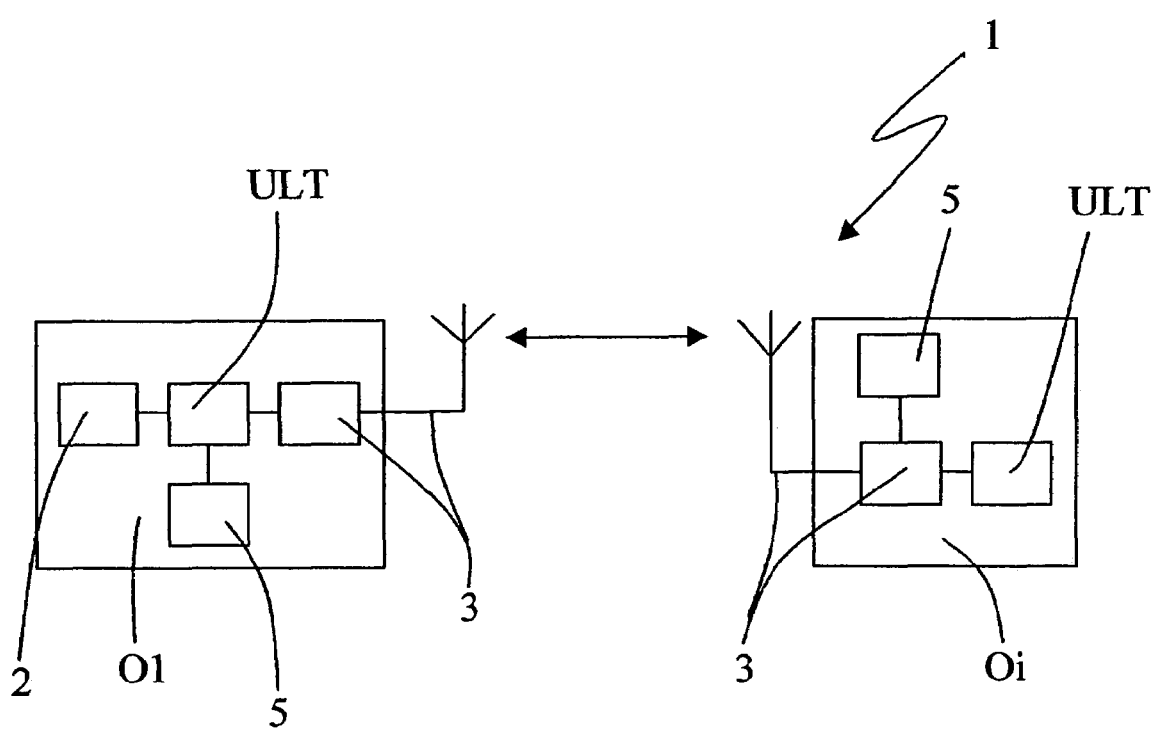
FIG. 1 is a diagram of an installation allowing implementation of the method.

The method of communication is applied to a network 1 comprising objects O such as represented in FIG. 1. These objects each comprise a logic processing unit ULT linked to a memory 5 and to communication means 3, such as transmitters receiving radio signals. Certain objects may moreover exhibit a user interface 2 allowing a user to act on the network 1.

The memory 5 of each of the objects contains a mathematical mapping F dependent on two variables. This memory 5 is also intended to contain keys K, that is to say confidential information. The objects O of the network each comprise means of communication that may be unidirectional or bidirectional.

Object number i in the network is denoted Oi.

Key number n of object Oi is denoted Kni.

Figure 2:
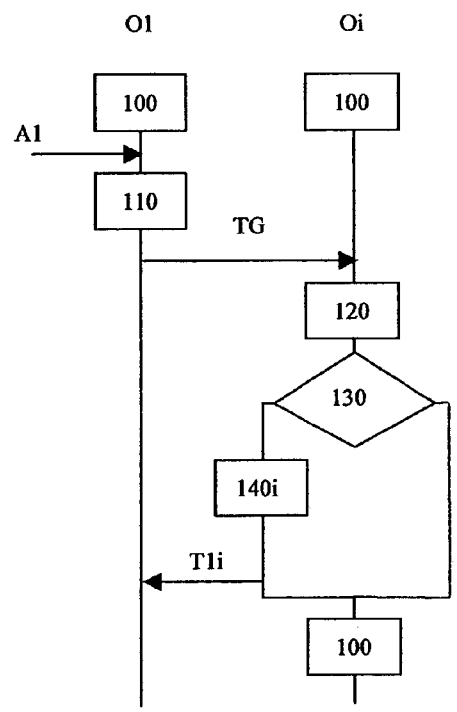
FIG. 2 is a flowchart of the method according to the invention.

In FIG. 2, representing the flowchart of the method of communication, the object O1 and the objects Oi use one and the same communication protocol.

The objects O1 and Oi have respectively in memory a key K11 and K1$i$. This information has been recorded in memory during a phase of configuration of the network or of manufacture of the objects.

The configuration of the network having been carried out during a prior phase, the situation is one in which each object O1, Oi respectively activates a network listening program 100.

An action, represented by the arrow A1, for example the pressing of a combination of buttons of the keypad of the object O1, causes the activation of an order transmission program 110.

This program:
generates a random number N1,
calculates the image R11 of this random number N1 via the mapping FK11, the image of K11 via the mapping F,
causes the transmission of a frame TG, represented by an arrow in FIG. 2.

Figure 3:
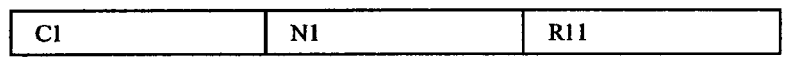
FIG. 3 is a diagram representing the information contained in the frame of a message transmitted by an object communicating according to the method.

This frame contains, as represented in FIG. 3, an order C1, the random number N1 generated by the transmitting object O1 and the image R11 of the random number N1 via the mapping FK11.

The other objects Oi of the network receive the frame TG and each analyze it with the aid of a program 120.

In each object Oi, this program:
identifies the various elements C1, N1 and R11 in the frame TG,
calculates the image R1$i$ of this random number N1 via the mapping FK1$i$, itself the image of K1$i$ via the mapping F.

A test program 130 is then activated in each object Oi. The latter compares the image R1$i$ calculated by the object Oi and the image R11 calculated by the object O1.

If these two values are equal, a program 140$i$ specific to each object Oi is activated. This program allows the execution of the order Cl by the object Oi. It causes the optional sending, to the transmitting object O1 that transmitted the order, of an acknowledgement of receipt frame T1$i$ and then activates the network listening program 100.

If the image R1$i$ calculated by the object Oi is different from the image R11 calculated by the object O1, the order does not concern the object Oi since its own calculation result is not that which accompanied the broadcasting frame and activates the network listening program 100.

For the orders contained in the frames transmitted by the transmitting object O1 to concern the objects Oi, it is necessary for the objects Oi to have in memory a key K1$i$ equal to the key K11 contained in memory in the transmitting object O1. These keys have to have been shared during a prior phase of configuring the network. The objects having one and the same key constitute a group. The techniques for creating a group or a network from among objects communicating with the aid of one and the same protocol are known to the person skilled in the art.

The keys may also be recorded in memory during the construction of the objects and be common to an objects manufacturer, or even to an objects manufacturer group.

The invention applies also to the case where several keys Kni may be known to one and the same object Oi, due to the fact that it belongs to several different groups. A variant of the mode of execution described therefore consists in including in the frame an item of information regarding the key to be used. In the simplest case, this item of information is a serial number.

For example, if in the frame, it is stated that the criterion of broadcasting of the order is the key 3, then all the objects Oi that receive the frame carry out the calculation pertaining to N1 with the mapping that is the image of the key K3$i$ via the mapping F.

Figure 4:
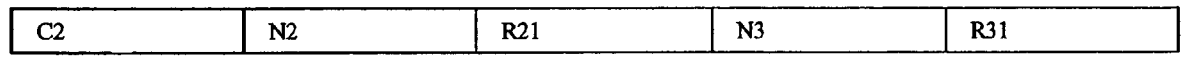
FIG. 4 is a diagram representing the information contained in the frame of a message transmitted by an object communicating according to a variant of the method.

Finally, FIG. 4 shows how it is possible, in a single broadcasting frame, to proceed to a selective designation associating two criteria. The field containing an order C2 contains a particular code indicating whether a multicriterion broadcast is involved, possibly by specifying the type or the order of the keys to be used.

The frame then contains at least two numbers generated N2, N3 by the transmitting object O1 and the images R21, R31 of these numbers via the mappings associated with two different keys contained in the transmitting object O1.

In this case, the program 120 has to be iterated with regard to the pair N2, R21 and with regard to the pair N3, R31 to determine whether the broadcast concerns the object. It is then possible to use logic functions conditioning the execution of the order transmitted in the frame. For example, the order will be executed by the object if one or other of the tests is successful or the order will be executed by the object if both of the tests are successful.

Finally, the method may be applied to encrypted transmissions. The mathematical or logical manipulations applied to perform the authentication may be of any nature. The key may be shared as its stands or in a derived form, different in each object.

The method according to the invention is particularly beneficial when the various objects communicate with one another remotely by virtue, for example, of infrared or radio waves. However, the principle of the invention may also be applied when the objects communicate with one another by virtue of wire means.

The method according to the invention can in particular be used to allow communication between certain equipment of a home automation network catering for the comfort and/or the security of a building and transmitters of orders and/or sensors making it possible to control this equipment.

What is claimed:

1. A method of communication between elements of a same network for the control of home automation devices providing heating, ventilating, air conditioning, closing, lighting, or solar protection, each element comprising a memory in which one and the same mathematical mapping F is dependent on several variables and at least one key and communicating among themselves by virtue of one and the same authentication protocol, the method comprising the following steps:

generation, by a first element O1, a single number N1;

calculation, in the first element O1, of a mathematical image R11 of the single number N1 via a mapping FK11 which is itself a mathematical image via the mapping F contained in memory, of the key K11 which the first element O1 contains;

transmission, by the first element O1, of a frame TG containing at least one command C1, the single number N1 generated by the first element O1 and its image R1;

reception of this frame TG, by at least a second element Oi;

calculation, in the at least second element Oi, of a mathematical image R1$i$ of the number N1 generated by the first element O1 via a mapping FK1$i$ which is itself a mathematical image via the mapping F contained in memory, of the key K1$i$ which the at least second element Oi contains;

comparison, in the at least second element Oi, of the mathematical image R1$i$ specific to the at least second element Oi with the mathematical image R11 specific to the first element O1, and execution of the command C1 by the at least second element Oi whose mathematical image R1$i$ is equal to the mathematical image R11, wherein the key K11 is shared by several elements of the network so that the at least one command can be executed by a single home automation device or by a group of home automation devices of the network.

2. The method as claimed in claim 1, wherein the key K1$i$ which each second element Oi contains has been shared by several second elements Oi during a prior configuring phase.

3. The method as claimed in claim 1, wherein the key K1$i$ which each second element Oi contains is the same for each second element Oi which has been built by one and the same manufacturer.

4. The method as claimed in claim 1, wherein the key K1$i$ which each second element Oi contains is the same for each second element Oi which has been built by one and the same group of manufacturers.

5. An installation for the implementation of the method as claimed in claim 1, comprising elements including at least one home automation device for the comfort and/or security of a building and an object being a command transmitter controlling the device or devices or a sensor controlling the device or devices, wherein each element O comprises a memory in which is recorded one and the same mathematical mapping F, means of communication with the other elements and a logic processing unit (ULT) comprising a program for generating random numbers and a program for calculating the image of a value via the mapping F.

* * * * *